No. 690,781. Patented Jan. 7, 1902.
E. W. SILSBY.
PLAITING MACHINE.
(Application filed May 21, 1900.)

(No Model.) 5 Sheets—Sheet 1.

Witnesses.
Edward T. Wray.
Edgar L. Conant.

Inventor.
Eugene W. Silsby
by Burton Burton
his Attys

No. 690,781. Patented Jan. 7, 1902.
E. W. SILSBY.
PLAITING MACHINE.
(Application filed May 21, 1900.)
(No Model.) 5 Sheets—Sheet 2.

Witnesses.
Edward T. Wray.
Edgar L. Conant.

Inventor.
Eugene W. Silsby
by Burton Burton
his Atty's.

No. 690,781. Patented Jan. 7, 1902.
E. W. SILSBY.
PLAITING MACHINE.
(Application filed May 21, 1900.)
(No Model.) 5 Sheets—Sheet 3.

Witnesses.
Edward T. Wray
Edgar L. Conant.

Inventor.
Eugene W. Silsby
by Burton & Burton
his Atty's

No. 690,781. Patented Jan. 7, 1902.
E. W. SILSBY.
PLAITING MACHINE.
(Application filed May 21, 1900.)
(No Model.) 5 Sheets—Sheet 4.
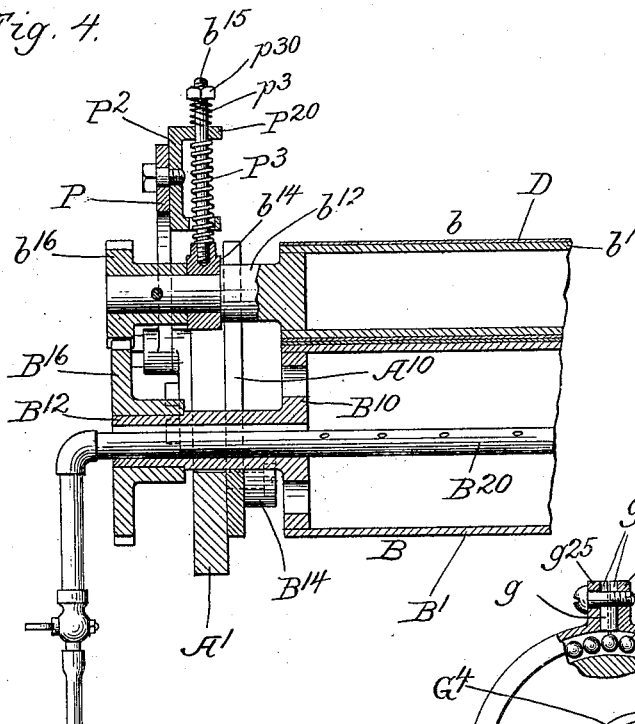
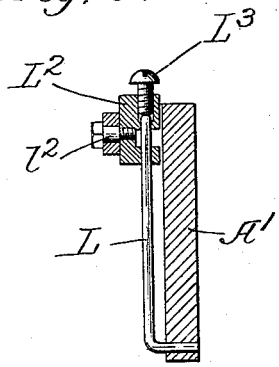
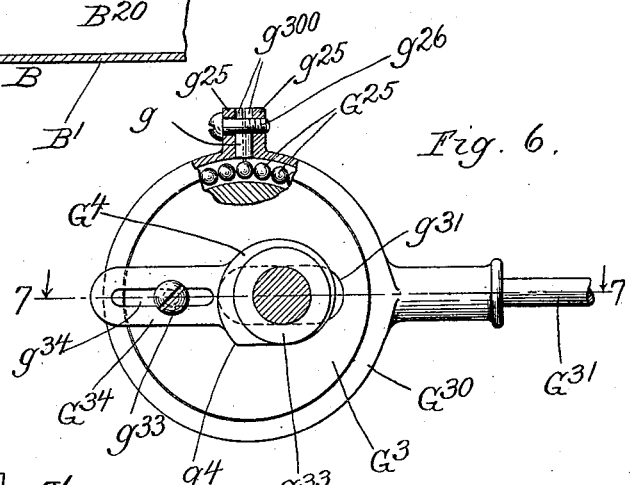
Witnesses:
Edward T. Wray.
Edgar L. Conant.
Inventor.
Eugene W. Silsby
by Burton Burton
his Atty's No. 690,781. Patented Jan. 7, 1902.
E. W. SILSBY.
PLAITING MACHINE.
(Application filed May 21, 1900.)
(No Model.) 5 Sheets—Sheet 5.

Witnesses,
Edward T. Wray.
Edgar L. Covant.

Inventor:
Eugene W. Silsby
by Burton & Burton
his Atty's.

UNITED STATES PATENT OFFICE.

EUGENE W. SILSBY, OF LAGRANGE, ILLINOIS.

PLAITING-MACHINE.

SPECIFICATION forming part of Letters Patent No. 690,781, dated January 7, 1902.

Application filed May 21, 1900. Serial No. 17,388. (No model.)

*To all whom it may concern:*

Be it known that I, EUGENE W. SILSBY, a citizen of the United States, residing at Lagrange, county of Cook, State of Illinois, have invented certain new and useful Improvements in Plaiting-Machines, of which the following is a specification, reference being had to the accompanying drawings, forming a part thereof.

Figure 1:
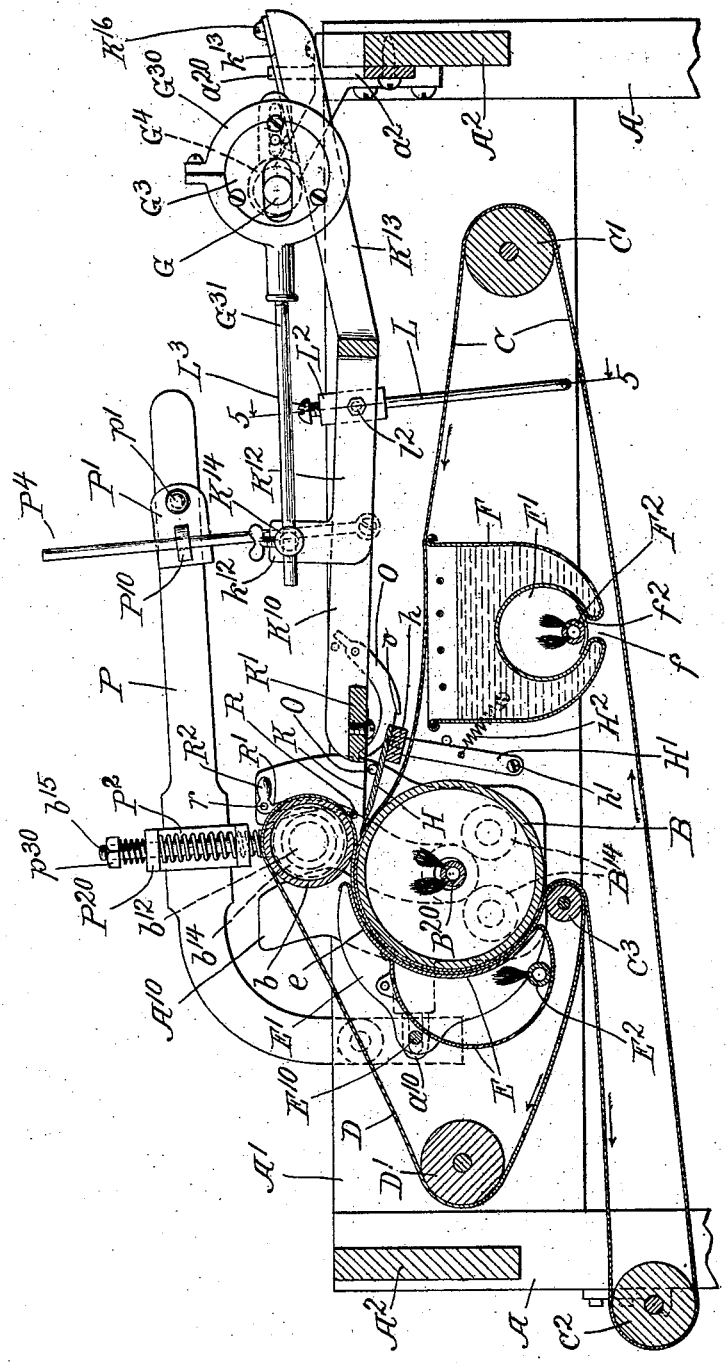
Figure 2:
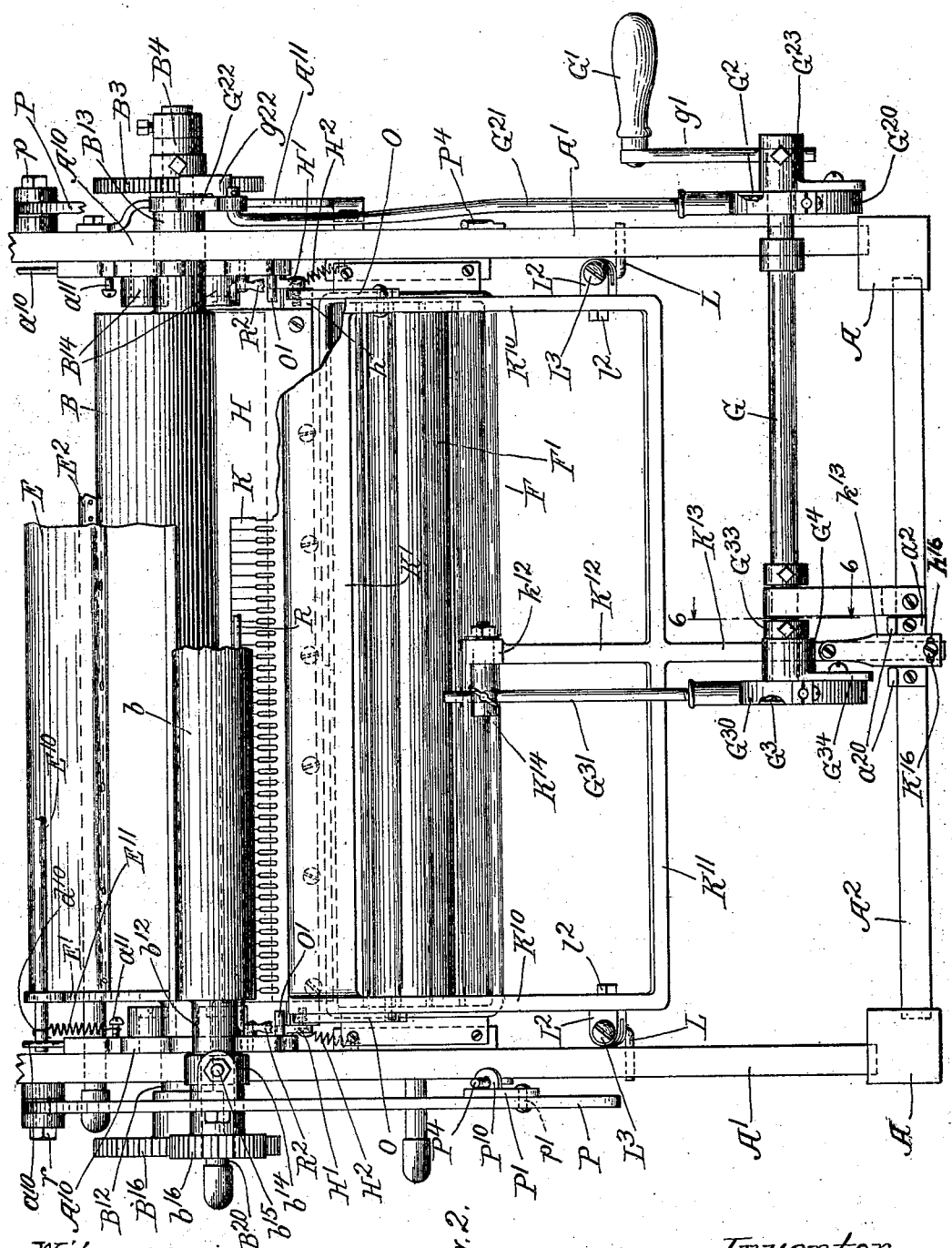
Figure 3:
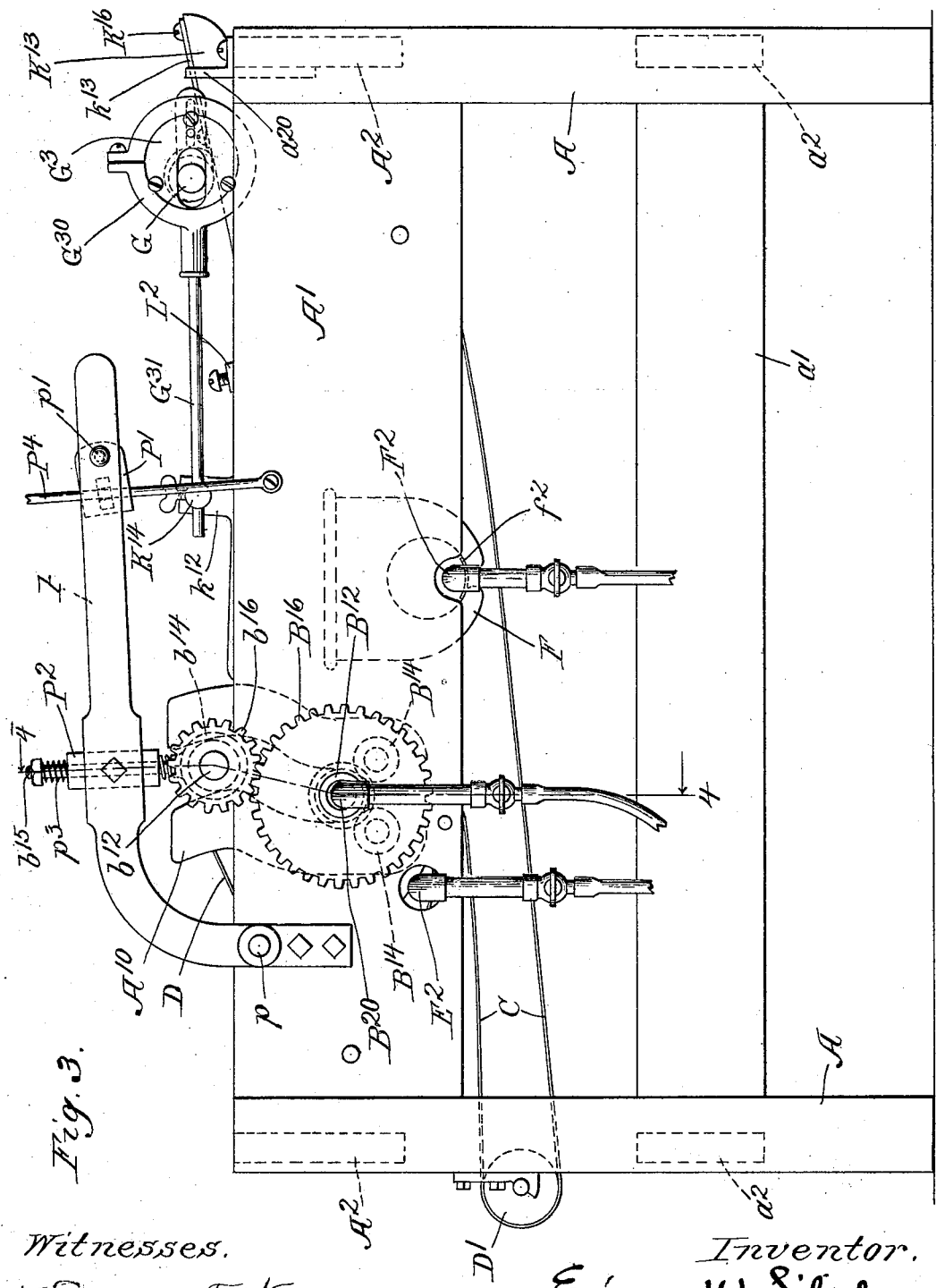
Figure 10:
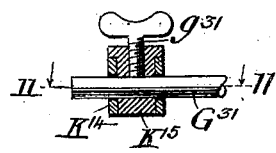
Figure 11:
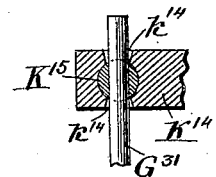
Figure 9:
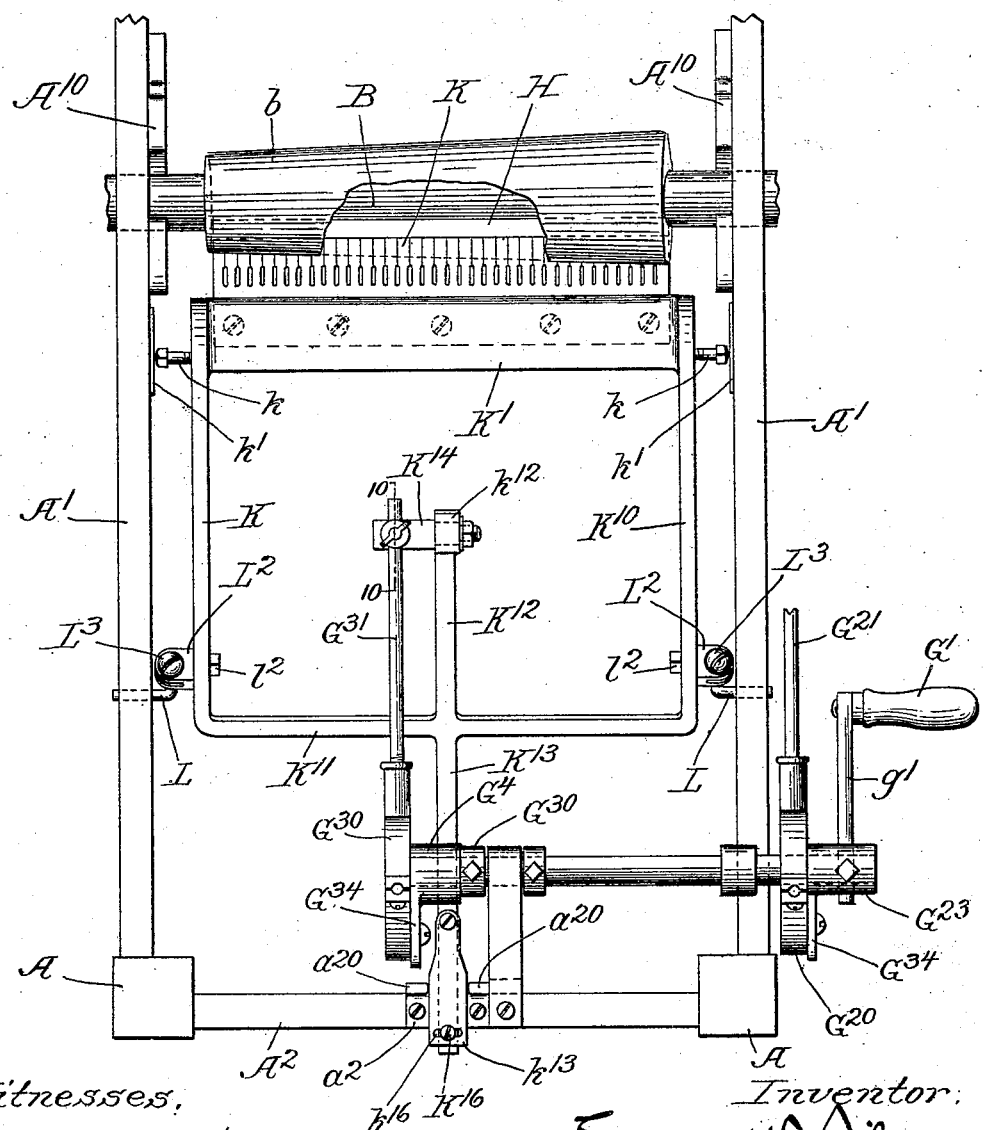

In the drawings, Figure 1 is a fore-and-aft vertical section of my improved machine. Fig. 2 is a top plan of the greater portion of the machine with the aprons removed and certain other parts partly broken away to disclose the structure beneath. Fig. 3 is a side elevation of the machine on the same scale as Fig. 2. Fig. 4 is a detail section at the line 4 4 on Fig. 3. Fig. 5 is a detail section at the line 5 5 on Fig. 1. Fig. 6 is a detail section at the line 6 6 on Fig. 2 upon a large scale. Fig. 7 is a detail section at the line 7 7 on Fig. 6. Fig. 8 is a detail side elevation of the step-by-step feed devices for rotating the rolls. Fig. 9 is a detail plan, with some parts omitted, showing a modification in the form of the pressing-rolls. Fig. 10 is a detail section, on larger scale, at the line 10 10 on Fig. 9. Fig. 11 is a detail section at the line 11 11 on Fig. 10.

My improved plaiting-machine is designed to lay plaits across the entire width of any web of fabric which may be passed through it, and as illustrated it is designed to operate upon goods of considerable width, taking muslin, cambric, and dress fabrics generally in the full width of the piece, the plaits being laid and ironed and rendered permanent in the passage of the goods through the machine.

This machine comprises a rigid frame, which is represented as made of wooden bars and posts suitably framed together, A A A A being four corner-posts, A' A' a' a' being, respectively, upper and lower longitudinal bars connecting the posts of each side $A^2$ $A^2$, and $a^2$ $a^2$ being corresponding upper and lower transverse bars connecting the posts, respectively, at the ends.

B b are respectively lower and upper pressing-rolls, between which the plaited fabric is fed, after the plaits are laid, to press them and render them permanent. One of these rolls is designed to be heated and operated as an ironing-roll, and I do not limit myself to making only one of them thus. The roll B is shown as the heated roll. It is very much larger than the other roll b and comprises a hollow cylinder or shell B', having suitable heads $B^{10}$ and $B^{10}$ at the opposite ends, respectively, said heads having their axles in the form of trunnions or gudgeons $B^{12}$ and $B^{13}$, respectively, one of said trunnions, as $B^{12}$, being hollow to admit the fuel-gas burner in the form of a perforated pipe $B^{20}$, which is inserted through said hollow trunnion into the roll for the purpose of heating the latter. The side bars A' A' are slotted or notched from their upper edges downward to admit the trunnions of both rolls to their proper position, and on the inner sides of said side bars A', I secure the metal plates or standards $A^{10}$ $A^{10}$, which are provided with slots corresponding to the slots in the side bars A' and which are designed to check and guide the trunnions. For the lower roll B bearings are provided by means of two antifriction-rollers $B^{14}$ $B^{14}$, which are suitably mounted on said plates $A^{10}$. (See Figs. 1 and 4.) The smaller roll b is similar in construction, except that when it is not to be heated its trunnions or axle need not be hollow, and they are therefore shown solid. On said trunnions $b^{12}$ $b^{12}$, constituting the axle of the upper roll immediately adjacent to the plates $A^{10}$, I place collars $b^{14}$ $b^{14}$, having stems $b^{15}$ $b^{15}$ extending upward and controlled by lever-operated connections adapted to lift and depress the rolls and arranged to apply yielding pressure thereon, as hereinafter described. The two rolls are geared together at one end by means of gears $B^{16}$ $b^{16}$ on the outer ends of their trunnions, respectively, the mesh of the teeth being sufficient to allow for the necessary slight variation in the separation of the rolls as the plaited material is sent through them. Around each of the pressing-rolls an endless apron passes, both aprons being thus pressed between the rolls. The apron C, which passes around the roll B, passes also about the rolls C', $C^2$, and $C^3$, the rolls C' and $C^2$ being at the forward and rear part of the machine, respectively, quite remote from the roll B, and the roll $C^3$ being located in position to hold the apron C against the roll B for a large part of the circumference of said latter roll. As illustrated, the roll C³ is located about opposite the roll b, and thus holds the apron on the roll B through about half the circumference of the latter. The apron D, which passes about the roll b, passes therefrom around the roller C³ and thence back around the roller D at the rear part of the machine. This apron is held against the apron C over the portion of the roller B about which the latter apron extends. In the substantially triangular space which is thus inclosed by the plies of the apron D there is located a pressing or ironing shoe E. This shoe is in the shape of a hollow drum crescent-shaped in cross-section, having its concave face conformed substantially or approximately to the cylindrical outer surface of the roll B, allowing, however, for the thickness of the two aprons which are held on the roll B by the location of the roller C³, as described. This shoe thus has its said concave face pressing against the inner surface of the ply of the belt D, which runs from the roller b to the roller C³. The concave face of the pressing-shoe E is extended, as shown at e, beyond the crescent outline of cross-section of the drum, constituting a lip which bears upon the surface of the apron over a somewhat-greater portion of the circumference of the roll B than is covered by the drum. The drum E is open at the ends, but is secured to head-pieces E' E', which are connected by the rod $E^{10}$, said rod extending beyond the plates at both ends and being guided in loops or staples $a^{10} a^{10}$, which are secured to the rear edge of the standards $A^{10} A^{10}$, respectively. Springs $E^{11} E^{11}$, connected to the rod $E^{10}$ at $d^{10}$ between the plates E' and the staples $a^{10}$, are connected at the other end to studs $a^{11}$, projecting inwardly from the standards $A^{10}$, and tend thus to hold the drum forward against the apron—that is, toward the roll B. The springs $E^{11}$ may be adapted to give any desired pressure. A fuel-gas burner $E^2$ in the common form of perforated pipe extends longitudinally through the drum E at the lower side and affords means for heating the concave face of the drum, adapting it to act as a pressing or smoothing iron. This shoe by the shape and location given it is adapted to guide the apron around the portions of the heated roll B toward which the shoe is held by the spring $G^{11}$, so that the aprons will be held against said roll even though they should be so slack that but for the shoe they would droop away from it. In this function it supplements the roller C³ and renders that roller not indispensable, though for greater efficiency both are preferably employed. Even in the absence of the upper or outer apron the fabric itself, if somewhat stiff, would be directly guided by the shoe about the heated roll; and it is so guided, in fact, when it is carried between the aprons which are so guided.

Between the two plies of the apron C and between the roll B and the roller C', I locate a vessel F, which I call a "steamer," the same being designed to contain water to be heated, so as to produce steam, for a purpose hereinafter explained. This steamer is an upwardly-open metal tank extending crosswise of the apron C, its upper edge and mouth being in a position such that the apron running from the roller C' to the roll B travels close to said edge and may rest upon it, substantially covering and closing the mouth of the steamer. A tubular opening is formed longitudinally entirely through this steamer, having a diameter somewhat more than half the entire width of the steamer, and a rift or slot is made from said tubular opening through the bottom, forming thus a narrow or contracted mouth f' into an enlarged cylindrical chamber F', open at the ends, as seen most clearly in Fig. 1. The purpose of this formation is to give a large heating-surface, upon which gas-flame supplied through a fuel-gas burner in the form of perforated pipe $F^2$, which extends longitudinally through this cylindrical chamber, may operate in order to heat the water in the steamer for the purpose indicated, and also to divert the products of combustion from the gas-flame, so that they may be delivered upward at a point laterally beyond the conveying-apron and the fabric which may be thereon, (or beyond the fabric itself, if the apron is absent,) thus avoiding the danger of scorching the apron or fabric and preventing the same from being dried by said hot products of combustion after having been moistened by passing over the open mouth of the steamer. I preferably form this cylindrical chamber F' by introverting the bottom of the steamer in the form indicated and illustrated, joining it to the heads or ends of the same at the margin of an aperture formed in said heads corresponding to the cross-section of the "heating-chamber," as the cylindrical chamber F' may be termed. $f^2 f^2$ are narrow straps extended across the rift $F^{20}$ to support the gas-burner $F^2$.

In the operation of this structure the fabric to be plaited is fed in between the two aprons C and D, the plait being laid by mechanism, hereinafter described, operating at the entering side of the rolls B b. The steam generated in the steamer F causes the apron C as it passes over said steamer to become suitably moistened, and as such moistened apron passes between the two rolls B b the roll B being heated by the burner within it causes the moisture carried by the apron to be revaporized and driven out through the plaited fabric, which lies immediately above said apron, this effect occurring at the instant that the fabric passes in between the two aprons and is pressed between the rolls. The moistening and pressing is continued while the fabric is carried around between the two aprons, which are pressed upon the rear side of the roll B, both by the arrangement of the aprons and, further, specially by the drum or ironing-shoe E, and while passing under said shoe, the latter being also heated by the burner extending within it, as described, the plaited fabric is exposed to heat at both sides, is thoroughly dried, and the plaits formed in it are made permanent, and in this condition the plaited web is delivered from between the two aprons, where they both pass off from the roll $C^3$ continuously along the upper ply of the belt or apron C, traveling rearward, and may be taken up where it passes over the roll $C^2$ at the rear.

I will now describe the mechanism for laying the plaits and other details of the structure.

Upon the forward part of the frame there is journaled a shaft G, parallel with the axes of the rolls B b. This shaft is arranged to be operated in any convenient manner, as by a crank G'. On the shaft outside the frame, at the side opposite that at which the several gas-pipes lead to the heating devices, there is fixed an eccentric $G^2$. From the ring $G^{20}$, which encompasses this eccentric, the rod $G^{21}$ extends to a lever $G^{22}$, which is fulcrumed about the shaft or trunnion of the roll B. On said trunnion alongside the lever there is fixed a ratchet-wheel $B^3$, and a pawl $g^{22}$ on the lever $G^{22}$ overhangs the periphery of said ratchet-wheel and is adapted to actuate it with a step-by-step movement, as the rotation of the shaft G causes the eccentric $G^2$ to reciprocate the pitman $G^{21}$, giving the feed movement in one direction and the retracting movement of the pawl over the ratchet in the reverse direction. The direction of the feed movement is such as to cause the rolls B and b to revolve toward each other at the side toward the shaft G, which is termed the "entering" side of the rolls. The step-by-step movement thus given, it will be seen, is communicated to both the rolls B b and to both the aprons C and D. Above the upper ply of the apron C, at the entering side of the pressing-roll, there is located a platen H, which extends the whole length of the rolls parallel therewith, being secured to a bar h, which is supported on arms H' H', extending downward from the platen and bar and pivoted at h' to the side bars A' A'. Upon the side of the platen toward the rolls said platen is tapered off on the under surface, reducing it in thickness at that edge, and said platen is hung and supported so that at its most advanced position it extends tangent to the roll B at a point nearly up to the line of engagement of the two rolls, the apron being constructed so that it sags a little at the entering side of the roll, drooping between the point at which it runs over the steamer F and the point where it comes in contact with the roll. The fabric to be plaited is designed to be run in above the platen H, said platen being intended to support the fabric at the point where it is acted on by the tucker to lay the plaits just before it enters between the aprons. The tucker which operates with this platen to lay the plaits comprises a suitably-toothed blade K, extending parallel with the rolls at the entering side thereof and lodged upon the upper surface of the platen H, said blade being mounted upon the transverse bar K' of the tucker-frame, which comprises, in addition to said bar K', the side bars $K^{10}$ $K^{10}$, the forward transverse bar $K^{11}$, and a stem $K^{12}$, which is rigid with the forward bar $K^{11}$ at the middle part of its length and extends both forwardly and rearwardly from said bar for purposes hereinafter explained. This tucker-frame is fulcrumed a little rearward of the forward bar $K^{11}$ at the upper end of the tilting supports L L. These tilting supports are pivoted at their lower ends in the side bars A' A' of the frame, (see Fig. 5,) and being made of round rod bent at the lower end to form the said lower pivots they are provided at the upper end with clips $L^2$ $L^2$, to which the side bars $K^{10}$ $K^{10}$ of the tucker-frame are connected by means of the pivot-screws $l^2$. For a purpose hereinafter explained the clips $L^2$ are made vertically adjustable on the tilting levers L L, said clips being bored vertically to adapt them to be passed onto the upper ends of said rods which form said levers and having each an adjustable screw $L^3$, set into the upper end of the hole bored for this purpose and forming a stop which limits the distance to which the clips may be passed onto the rods, as seen most clearly in Fig. 5. The stem $K^{12}$ of the tucker-frame is extended forward beyond the cross-bar $K^{11}$ and in this portion is bent upward at an angle to the general plane of the frame, forming a guide-arm $K^{13}$, which is lodged in a guide-bearing $a^2$, mounted on the forward end bar $A^2$ of the main frame. The stem $K^{12}$ terminates at the rear end approximately half way between the cross-bars K' and $K^{11}$ in an upstanding finger or lug $k^{12}$, in which a pivot-stud $K^{14}$ is journaled, projecting horizontally and having an aperture extending through it, through which there is inserted the connecting rod or pitman $G^{31}$, which extends from the ring $G^{30}$, which encompasses the eccentric $G^3$, fixed on the left-hand end of the shaft G, said eccentric and encompassing ring being in construction the same as the eccentric $G^2$ and the ring $G^{20}$ at the opposite end of said shaft. It will be seen that as the shaft G is revolved the action of the eccentric $G^3$, reciprocating the connecting-rod $G^{31}$, will reciprocate the tucker-frame, causing the tucker-blade to vibrate back and forth over the platen, on which it will be held by gravity, said tucker-frame being overbalanced on the side of its fulcrum toward the rolls B b. The tucker-blade K must stand at a certain slight angle to the platen in order to engage the fabric, and since it is most convenient to have the action of the tucker substantially horizontal the platen H is inclined, as seen in Fig. 1, and since the platen at its leading edge at its most advanced position should nearly reach the line of contact between the cylindrical surfaces of the opposed rolls or the aprons on them, respectively, it must be approximately tangential to said cylindrical surfaces at said line. This plan of construction in connection with the fact that the lower roll is very much the larger of the two results in the location of the axis of the larger roll in advance in the direction of the feed movement of the fabric of the axis of the smaller roll. The same result will follow without regard to which of the two rolls is the upper and which the lower if the machine is arranged so that the fabric may be entered between the rolls approximately horizontally and in position to permit the operation of the tucker and the rolls in fastening the tucks to be readily observed by the operator, and in respect to this feature I do not limit myself to locating the larger roll below the smaller. It is desirable, also, that the tucker-blade should perform its advancing or tucking movement in a plane as nearly as possible tangential to the two opposed cylindrical surfaces at their line of contact, so that when it enters between the rolls in the culmination of its plaiting action it shall not necessarily be distorted nor bent out of its line of stroke by impinging on either roll and may be free to withdraw with the least possible tendency to drag the cloth back with it. Since it is impossible that both the platen and the tucker, which are at an angle, should both advance tangentially with respect to the same line of contact of the same cylindrical surfaces, I approximate the desired result by causing both of said parts to be located approximately in such tangential plane, one a little above, the other a little below, such plane.

In order to relieve the fabric of the pressure of the tucker-blade during the retracting movement, I provide on the shaft G, in addition to the eccentric $G^3$, a cam $G^4$, which operates on the upper edge of the guide-arm $K^{13}$ of the tucker-frame, with a tendency to depress said arm, and thereby lift upward the tucker-blade at the proper time with respect to the retracting movement. The construction for this purpose requires such nicety of adjustment that I consider it essential to provide for such adjustment in a manner which will permit it to be made after the parts are shaped and assembled, not relying on such perfect accuracy or uniformity in their original formation as to secure the result without subsequent adjustment. For this purpose I provide a stop-screw $L^3$, set into the pivot-clip $L^2$ and which may be screwed thereinto more or less, thus lifting the fulcrum more or less and bringing the tail $K^{13}$ nearer to or depressing it, so as to be farther from the cam $G^4$.

On each side bar of the tucker-frame there is pivoted a step-tooth dog, which overhangs the forward end of the bar $h$, which supports the plate H, and which has a shoulder $o$ facing toward said bar and arranged to encounter it as the dog is moved with the forward or plaiting movement of the tucker-frame after a certain portion of the stroke is made, thus carrying the plate H with the tucker-blade during the portion of the feed movement after such encounter occurs, only, however, until the nose of the dog encounters the trip-pin $O'$, which projects inward from the side bar of the frame in position to be thus encountered after a certain short movement of the plate with the tucker-blade. On such encounter the dog is forced out of engagement with the bar $h$, and the spring $H^2$, attached to the supporting-arm $H'$ of the plate H and to the side of the frame at a distance forward therefrom, retracts said arms and the plate H, while the tucker-blade continues to advance the remainder of the stroke, (which is regulated as hereinafter described.) The movement of these parts described is designed to act upon the fabric operated upon as follows: The fabric running between the plate H and the tucker-blade and thence between the rolls—that is to say, between the aprons which encompass the rolls being engaged by the teeth of the tucker-blade in the first part of the movement—is advanced upon the plate H, throwing up the tuck or fold which overhangs the edge of the tucker-blade. The two eccentrics $G^2$ and $G^3$ are designed to be so adjusted and timed on the shaft G in respect to each other that this portion of the stroke of the tucker-blade which determines the width of the plaits is completed before the rotation of the rolls commences. When the rolls commence to rotate, the plate H also commences to move forward with the tucker-blade at a speed substantially equal to the circumferential speed of the roller B. Thus the plait or tuck which is formed by the movement of the tucker-blade, which occurs before the plate H and the roll commence to move, is carried forward with the entire fabric bodily toward the rolls until the dog O encounters the trip-pin $O'$ and is disengaged from the plate, and the latter is retracted by its springs. This action is designed to occur a little before the advance edge of the plate H reaches the line of tangential contact or nearest approach of the two rolls—that is to say, before said plate would become pinched or engaged by the pressure of the rolls. The withdrawal of the plate leaves the tucker-blade in position to press the fold of the plait which is formed directly onto the apron C, and said tucker-blade moves on forward substantially at the speed of the apron for a short distance sufficient to carry the fold of the plait between the rolls—that is, into position where it will be grasped between the belts by the opposing pressure of the rolls. Such grasp secures the plaits, and the mechanism is so timed that at this stage the tucker-blade shall commence to withdraw, the pressure upon the fabric being relieved as it withdraws by the action of the cam $G^3$, as above described, said cam being so formed as to hold the blade up out of contact with the fabric during the entire retracting movement and to allow the edge of the blade to drop again onto the fabric and engage it between its points and the plate H at the instant the feed movement of the rolls ceases or very shortly thereafter. The action described enables me to plait goods having a marginal hem or longitudinal felled or other heavy seam without the embarrassment which usually arises in plaiting goods under such circumstances, which is caused by the excessive thickness of the three thicknesses of the hem or seam at the plait over the thickness of three plies of the fabric at the remainder of the plait, for when the plait is laid by the tucker it is advanced bodily by the equal movement of the tucker and plate H, and at the same time the rolls B $b$, having commenced to rotate, grasp the plait at the hem or seam, where the thickness is greatest, and carry it forward at the same speed at which the tucker and platen tend to carry the entire width of the fabric. The tucker is thus relieved of the burden of forcing the plaited seams and hems between the rolls and has merely the duty of holding the fold throughout the full length of the plait even, while the rolls, grasping the hem or seam, mainly do the work of advancing the plait between the rolls. The cam $G^4$ is, furthermore, so shaped that at the point in the advancing stroke of the tucker at which the tucker-blade runs off the advanced edge of the platen and carries the tuck which it is laying onto the apron C the cam, acting against the tail $K^{13}$, checks the tucker-frame and the blade from being sunken into the apron and becoming engaged therewith, as it might have a tendency to do both by the weight with which the frame causes it to operate downward and also by the fact of its advancing movement. This causes the tucker to operate on the fabric during this portion of its movement, while it is carried chiefly by the engagement of the rolls and their rotation, by such engagement as it may have obtained with the fabric during the time it was operating thereon above the platen, and thus avoiding a tendency to rupture the fabric or to render it difficult to disengage itself therefrom in the retracting movement. It will be noticed that the inclination of the tilting fulcrum-supports L L, being toward the pressing-rolls, causes the fulcrum to be carried downward in the advancing movement of the tucker-frame, and this descending movement of the fulcrum, which results in a further descending movement of the guide-arms upon which the cam operates, must be taken into account in shaping the cam $G^4$. Likewise in the retracting movement of the tucker-blade the inclination of the tilting fulcrum-supports L L causes the fulcrum to be elevated slightly. This effect is somewhat modified by the slope of the guide-arms $K^{13}$, and said slope and the inclination of said tilting fulcrum-supports are adapted to each other, so that in the stroke necessary for a tuck or plait of an average width the entire change of elevation of the sloping guide-arm $K^{13}$, which is exposed to the action of the cam, corresponds substantially to the change in elevation of the fulcrum due to the elevation of the fulcrum-support, the chord of the arc through which the fulcrum moves from most-advanced back to erect position being approximately parallel with the sloping guide-arm; but since the change in elevation of the fulcrum-support due to the tilting movement is greatest at its most inclined position and diminishes as it approaches the upright position there will always be a little lifting effect experienced by reason of this tilting at the instant the retraction of the tucker-blade commences. This is desirable because a similar lifting which might be caused by the shape of the cam acting upon the inclined guide-arm would be a little delayed by change of adjustment of the fulcrum-support lowering the same. In such case the tucker-blade will be lifted at the proper time notwithstanding such adjustment, and by the time the lifting effect of the tilting movement of the fulcrum ceases by reason of its approach toward vertical position the cam $G^4$ will come into action, if its action has been delayed by an adjustment lowering the guide-arms, and will continue the effect, upholding the tucker-blade and keeping it off the fabric during the remainder of the movement until the point $g^4$ of the cam comes around to the guide-arm and lets the tucker-blade drop again onto the platen or the fabric thereon. The combination, therefore, of the tilting fulcrum, the inclined guide-arm, and the cam operating upon the guide-arm to check the movement of the tucker-frame due to the overbalancing of the end toward the rolls under the action of gravity yields the result of relieving the fabric of the drag of the tucker-blade during its retracting movement and holding it off from the same during the entire length of that movement whatever be the adjustment of the mechanism as to the length of stroke or elevation of the fulcrum.

To carry the bearings of the upper roll $b$, I provide at each side a lever P, fulcrumed on the side bar of the frame at $p$ and latched, as hereinafter described, at $p'$, and having pivoted to it at intermediate points an angle-link $P^2$, rendered angular in form by a horizontally-jutting eye $P^{20}$ at the upper end, through which the stem $b^{15}$ of the collar $b^{14}$ extends. A spring $p^3$, coiled above the eye $P^{20}$ and stopped by a nut $p^{30}$, screwed onto the stem above said spring, is adapted to take the weight of the rolls B $b$ and the gears thereon, so that when the lever P is fixed in position the pressure operating between the rolls $b$ B may be independent of the weight of the rolls and gears thereon. Below the eye $P^{20}$ on the stem $b^{15}$ there is coiled a spring $P^3$, stopped at its upper end against the under side of the eye and reacting at its lower end against the collar $b^{14}$, which constitutes the bearing of the roll $b$, and so tending to resist the upward movement of said roll $b$ and to press it on the roll B with greater or less force, dependent on the amount of compression of the spring $p^3$, due to the adjustment of the lever P, as will now be described. On the forward arm of said lever P there is pivoted at $p'$, as stated, a short link P', having a horizontally-jutting eye $P^{20}$, through which extends a rod $P^4$, pivoted at its lower end on the outer side of the side bar of the frame. The link P', hanging loosely on its pivot $p'$, tends to droop, so that the edges of the eye in the lug $P^{10}$ tend to strike the rod $P^4$ and operate as a clutch engagement, which resists the upward movement of that arm of the lever, thus causing it to be substantially fast at both ends and making the eye $P^{20}$ of the link $P^2$ a positive stop against the upper end of the spring $P^3$. To increase the tension of said spring and its pressure upon the roll $b$, the operator will depress the forward end of the levers P P to any desired extent, the links P' operating as clutches, as described, engaging the rod $P^4$ and holding said end of the lever down to whatever distance it is depressed. To release and lift the lever, the operator will merely take hold of the link P' and lift it, slackening its grips upon the rod $P^4$ and leaving it free to slide up thereon. The purpose of the structure above described is to permit the entire structure, comprising the bearings of the upper roll and said roll and the springs which operate upon it in both directions, to be swung up out of place whenever it is desired to lift the roll away from the lower roll, thus avoiding any necessity for dismantling any part of the structure and permitting this movement to be performed in an instant, so that it may be done in the use of the device and not merely in its adjustment or reconstruction. This is a matter of great importance, because the operator can in an instant separate the rolls, adjust the fabric between them in any case in which it becomes distorted or enter fabric which may be difficult to enter in the ordinary method, and immediately restore the rolls without having disturbed the adjustment of the springs or being obliged to handle any part separately, merely manipulating the handles B.

The specific structure employed for the eccentrics $G^2$ and $G^3$ and their accompanying parts requires specific description. I will first describe the eccentric $G^3$ and its associated parts and then the slight modifications which are necessary in respect to the eccentric $G^2$ and its parts.

A collar or hub $G^{33}$ is pinned onto the shaft G by means of a set-screw. This collar $G^{33}$ has a radially-projecting flat arm $G^{34}$, which has the longitudinal slot $g^{34}$. The eccentric-plate $G^3$ has a slot $g^{31}$, large enough to admit the shaft G. A bolt $g^{33}$ passes through the slot $g^{34}$ in the arm $G^{34}$ of the collar $G^{33}$ and is screwed into the eccentric-plate $G^3$ beyond one end of the slot $g^{31}$. The shaft G passes through the slot $g^{31}$ and into the hub or collar $G^{33}$, the bolt $g^{33}$, being fast in the eccentric-plate and passing through the slot in the arm of the collar $G^{33}$, permits the adjustment of the two parts $G^3$ and $G^{33}$ relatively to each other, and thereby the adjustment of the plate $G^3$ with respect to the shaft G, and when the bolt $g^{24}$ is clamped tight the eccentric-plate $G^3$ is held tightly with respect to the shaft and eccentric thereto to such degree as may be desired, thus varying the feed-stroke, which gives the step rotation to the rolls, as may be desired. The periphery of the plate $G^3$ has a V-shaped groove $g^3$, and the inner periphery of the encompassing ring $G^3$ has a corresponding groove $g^{30}$, said grooves facing each other and adapted to contain antifriction-balls $G^{25}$. The ring $G^{30}$ is split at one side and provided with lugs $g^{25}$ adjacent to the slits and the bolt $g^{26}$, which is inserted through the lug and serves to clamp them together and close up the ring to any desired extent necessary to render the ball-bearings suitably close. The V-shaped grooves $g^{30}$ in the inner periphery of the ring $G^{30}$ are extended at $g^{300}$ along the facing surfaces of the lugs $g^{25}$ and constitute a duct leading from the inner ends of the lugs into the grooves $g^3$ and $g^{30}$. It is designed to introduce the balls into the bearings through this duct, a plug $G^{26}$ being inserted to close the duct behind them before the clamping-bolt $g^{26}$ is inserted. The structure of the eccentric $G^2$ and its accompanying parts is substantially the same as that described above with respect to the eccentric $G^3$ and its accompanying parts, except that the collar or hub $G^{23}$, corresponding to the collar or hub $G^{33}$, is secured to the shaft by means of the rod $g'$ of the crank G'. The collar $G^{33}$ has the cam, which acts upon the tail $K^{13}$ of the tucker-lever, formed integrally with it. The variation of the eccentricity of the eccentric-plate $G^3$ varies the stroke of the tucker-blade and the width of the tuck or plait laid thereby, while the variation of the eccentricity of the plate $G^2$ varies the feeding movement of the rolls B $b$.

When this machine is used in such adjustment as to cause it to lay "accordion" plaits—that is, successive plaits each overlapping the foregoing nearly the full width of the plait—there is a tendency in some goods for the plaits to be bulged out away from the roll, so that the latter will grasp perhaps each one plait in four or five, leaving the intermediate plaits free to become unfolded, so that they are not pressed between the rolls. To prevent this result, I provide a check-rod R, extending along in front of the roll at the entering side in position to bear against the fold of the plait as it is laid with a slight and yielding pressure, but sufficient to overcome the tendency of the goods to bulge away from the rolls and become unfolded. The most convenient manner in which this check-rod may be secured and caused to exert such yielding pressure is to suspend it by arms R' R' at the opposite ends from the supports of the upper roll, to which said arms are pivotally attached at r r, as seen in Fig. 1. The position of these pivots may be such that the weight of the check-rod, tending to swing inward from the roll, is sufficient to hold the plait in place, or a weighted arm may be used, as represented at $R^2$, to supply whatever pressure is necessary.

For the purpose of adapting this machine to lay plaits in groups with plain spaces between the groups I provide a lever $B^4$, swung on the end of the trunnion or axle of the roll B and having pivoted to it a pawl $B^{40}$, which is weighted at one end, and thereby adapted at the other end to engage the ratchet-wheel $B^3$ on the lower side of the latter. This lever is extended beyond the point at which the pawl is pivoted to it and provided at the end with a handle $B^{41}$, by which it may be operated. On the outer side of the frame-bars A', I secure a segment-guide, along which the lever-arm $B^4$ swings. On said segment-guide $A^{11}$ is a stop $a^{12}$, in position to check the arm $B^4$ at any desired position—as, for example, at a position vertically depending from the axle. Said segment-guide has a slot $a^{13}$, in which there is secured an adjustable stop $B^{42}$, which may be secured at any position in the slot more or less remote from the stop $a^{12}$, allowing any desired range of swinging movement to the lever $B^4$. In the continuous action of the machine caused by the rotation of the shaft G the pawl $B^{40}$ acts merely as a detent or locking-point, idling on the periphery of the ratchet-wheel $B^3$. When it is desired to introduce a plain space following any desired group of tucks or plaits, the rotation of the shaft G being stopped the operator will see that the handle of the lever $B^4$ swings said lever from the stop $a^{12}$ to the stop $B^{42}$ by feeding the fabric through between the rolls a distance corresponding to the distance at which the latter stop is adjusted from the former. The action of the shaft G can be then resumed. Another group of plaits can be laid continuously until it is desired to produce another group or space. The number of rotations of the shaft G performed in the interval between the operation of the lever $B^4$ determines the number of plaits which will be laid in each group between the spaces caused by the operation of said lever. Sometimes the character of the opposite lateral edges of the fabric causes a tendency to feed more rapidly at one edge than the other and sometimes it may be desired to feed one edge faster than the other when there is no such tendency. In the first instance the tendency must be counteracted by some increased potency of the feeding action at the side where the tendency is to feed less and in the other case the result desired is to be produced by such increased potency at the side to be fed faster. This can be accomplished in my machine, taking advantage of the fact that the tucker-frame has three points of guidance—two at the end toward the rolls, one at each side, where the adjustable studs k k abut against metal plates k' k', mounted on the inner side of the frame-bars A A, and the third where the guide-arm $K^{13}$ is lodged in the guide-bearing provided for it on the cross-bar $A^2$ at the forward end of the frame. Ordinarily and for direct parallel plaiting the three guide-bearings should be parallel and in the direction of the feeding stroke; but if the guide-bearing of the arm $K^{13}$ is rendered a little oblique to the stroke and to the other guides the effect is to throw one end of the advancing blade forward a little farther than the other, swinging the frame to some extent about the opposite guide-bearing as a fulcrum. In order to effect such a result by deflection of the third central guide, I cause the actual guidance at this point to occur at the plate $k^{13}$, which is mounted upon the upper edge of the arm $K^{13}$ and which is wider than that arm, so that its lateral edges bear against the guide projections $a^{20} a^{20}$ of the fitting $a^2$, mounted on the bar $A^2$, as described. This plate $k^{13}$ is pivotally attached at one end to the arm $K^{13}$, and at the other end it is transversely slotted at $k^{16}$ and secured by a screw $K^{16}$ through the slot, so that at that end it may be adjusted and made to stand oblique in either direction with respect to the other guide-bearings of the frame. When this oblique adjustment is made, the arm or rod $G^{31}$ will be sprung slightly by the swinging movement given the frame unless pivotal action is permitted at the connection of the rod $G^{31}$ with the frame. Such pivotal action is permitted and provided for by making the aperture $k^{14}$ through the stud $K^{14}$ elongated horizontally and at the same time making a vertical cylindrical aperture through the stud crosswise of the rod and lodging therein a cylindrical pivot-block $K^{15}$, through which the rod $G^{31}$ extends and into which the set-screw $g^{31}$ is screwed to secure the rod longitudinally. (See Figs. 10 and 11.) When such an adjustment as that above described is employed for the express purpose of feeding one edge faster than the other, and thus producing plaits wider at one end than at the other, as for the purpose of rosettes or sectoral sections of plaiting, it is desirable for the most perfect results that the feeding action of the pressing-rolls should be correspondingly faster at the end at which the plaits are laid wider, and this may be accomplished by employing tapering rolls, as illustrated in Fig. 9.

I claim—

1. In a plaiting-machine, a pair of pressing-rolls, and means for revolving them; endless aprons which pass about the rolls respectively, and are both pressed between them; means for moistening one of the aprons as it advances toward the rolls; means located between the plies of the other apron, in position to divert the emerging ply thereof about the opposite roll and for heating the two aprons where they are thus caused to overlie upon said roll; and plait-laying means, operating at the entering side of the rolls to plait the fabric and lay the plaits between the aprons as the latter enter between the rolls.

2. In a plaiting-machine, a pair of pressing-rolls; endless aprons which pass about the rolls respectively and are both pressed between them; means for moistening one of the aprons as it advances toward the roll; means located between the plies of the other apron, in position to divert the emerging ply thereof about the opposite roll; means for heating said opposite roll; and plait-laying means operating at the entering side of the rolls to plait the fabric, and to enter the plaits between the aprons as the latter enter between the rolls.

3. In a plaiting-machine, a pair of pressing-rolls; an endless apron passing about each of the rolls, both aprons being pressed between them; plait-laying means operating at the entering side of the rolls to lay the plaits in the fabric and enter them between the aprons as the latter enter between the rolls; and a pressing-shoe located between the plies of one of the aprons, having its face conformed substantially to the cylindrical surface of the opposite roll; and in position to divert the emerging ply of the apron between whose plies it is located, about said opposite roll.

4. In a plaiting-machine, a pair of pressing-rolls; an endless apron passing about each of the rolls, both aprons being pressed between them; plait-laying means operating at the entering side of the rolls to lay the plaits in the fabric and enter them between the aprons as the latter enter between the rolls; and a pressing-shoe, located between the plies of one of the aprons, having its face conformed substantially or approximately to the cylindrical surface of the opposite roll, and located in position to divert the emerging ply of the apron between whose plies it is located, about said opposite roll, and means for heating said shoe.

5. In a plaiting-machine, a pair of pressing-rolls; an endless apron passing about each roll and both aprons passing between the rolls; means for heating one of the rolls; a shoe located between the plies of the apron running about the other roll at the emerging side of the rolls, having a face substantially conformed to the cylindrical surface of the heated roll and in position to divert the emerging ply of said apron about said roll, and means for heating said shoe; and plait-laying means operating at the entering side of the rolls to lay the plaits in the fabric and to enter same between the aprons as the latter enter between the rolls.

6. In a plaiting-machine, a pair of pressing-rolls; an endless apron passing about each roll and pressed between the rolls; plaiting means located at the entering side of the rolls operating to lay the plaits in the fabric and enter the same between the aprons as the same enter between the rolls; means for moistening one of the aprons before it enters between the rolls; a pressing-shoe located between the plies of the other apron at the emerging side, having a face substantially or approximately conformed to the cylindrical surface of the opposite roll, and in position to divert the emerging ply of the apron between whose plies it is located, about said roll; and means for heating the shoe.

7. In a plaiting-machine, a pair of pressing-rolls; an endless apron passing about each roll and pressed between the rolls; plaiting means located at the entering side of the rolls, operating upon the fabric to lay the plaits and enter the same between the aprons as the latter enter between the rolls; means for moistening one of the aprons before it enters between the rolls; a pressing-shoe located between the plies of the other apron at the emerging side of the roll, having one face conformed to the cylindrical surface of the opposite roll and in position to divert the emerging ply of the apron between whose plies it is located onto said opposite roll; means for heating said opposite roll, and means for heating the shoe.

8. In a plaiting-machine, a pair of pressing-rolls; an apron passing about one of them and pressed between them; a plait-laying device, comprising a tucking-blade and means for reciprocating it; means for giving the rolls step-by-step rotation with rest intervals; the advancing movement of the tucker-blade being timed to commence during the rest interval of the rolls, and to continue after the movement of the rolls commences, agreeing in speed substantially therewith.

9. In a plaiting-machine, a pair of pressing-rolls; an apron which passes between them and means for diverting it around one of them at the emerging side; a plait-laying device operating to lay the plaits on such apron at the side toward the roll about which it is diverted; such plait-laying means comprising a tucking-blade and means for reciprocating it to form the plait; means for giving the roll and apron step-by-step movement with rest intervals, the tucker-reciprocating mechanism being timed to commence the advance movement during the rest interval of the rolls, and to continue such movement after the rolls start, substantially at the speed of the latter.

10. In a plaiting-machine a pair of pressing-rolls; an endless apron which passes and is pressed between them, a plait-laying device comprising a tucking-blade and means for reciprocating it, means for giving the rolls step-by-step rotation with rest intervals, the tucking-blade operating to lay the plaits on the apron, its advancing movement being timed to commence during the rest interval of the rolls and apron, and to continue after the movement of the apron commences at a speed agreeing substantially with that of the apron; whereby the tuck or fold laid on the latter is positively carried with it in its advancing movement regardless of the grasp of the rolls on the tuck.

11. In a plaiting-machine, a pair of pressing-rolls and means for operating them; an endless apron which passes and is pressed between them as they rotate, and means for diverting such apron against one of the rolls at the emerging side; in combination with a plait-laying device comprising a tucking-blade to lay the plait on the apron at the entering side of the rolls at the side of the apron toward the roll against which it is diverted, having its range of action such as to carry the forward fold of the plait between the rolls; mechanism for reciprocating such blade timed to cause the blade in the closing part of its advancing tuck-forming movement to accompany the rotating movement of the rolls and the forward movement of said apron.

12. In a plaiting-machine, the pressing-rolls, and a platen and tucker-blade coöperating to lay the plaits at the entering side of the rolls; means for advancing both the platen and the tucker-blade toward the rolls; and means for retracting first the platen and subsequently the tucker-blade.

13. In a plaiting-machine, the pressing-rolls; a platen and tucker-blade between which the fabric is grasped at the entering side of the rolls; means for giving the rolls step-by-step rotation with rest intervals; means for advancing both the platen and tucker-blade toward the rolls during a rest interval of the latter; and means operating after the rotating step movement of the rolls commences for retracting first the platen and afterward the tucker-blade.

14. In a plaiting-machine, the pressing-rolls; a platen and tucker-blade between which the fabric is grasped at the entering side of the rolls; means for giving the rolls step-by-step rotation with rest intervals; means for advancing both the platen and tucker-blade toward the rolls during the rest interval of the latter; means coöperating after the rotating step movement of the roll commences, for retracting the platen, and continuing the advance of the tucker-blade during the early part of the feed movement of the rolls.

15. In a plaiting-machine, a pair of pressing-rolls, an apron which passes about one of them and is pressed between them, a platen overhanging the apron at the entering side of the rolls; a plait-laying tucker operating on the platen opposite the apron; means for reciprocating the tucker, and means for giving the rolls step-by-step rotation and for reciprocating the platen; the advancing movement of the platen being timed to correspond to the step rotation of the rolls both of said movements being timed to occur after a certain advance movement of the tucker, whereby the plait is first laid by the tucker on the platen, and then carried bodily between the rolls by the rotation of the latter and the advancing movement of platen and tucker.

16. In a plaiting-machine, a pair of pressing-rolls, an apron which passes about one of them and is pressed between the rolls; a platen overhanging the apron at the entering side of the rolls; a plait-laying tucker operating on the platen opposite the apron; means for rotating the rolls; means for reciprocating the tucker; a dog connected to the tucker, and engaging the platen after a certain part of the advance movement is performed, and carrying the tucker with the platen during a subsequent part of said advance movement; a trip disengaging the dog, and a spring which retracts the platen.

17. In a plaiting-machine, in combination with a pair of pressing-rolls, plaiting devices, comprising a platen and a tucker coöperating therewith to lay the plaits and advance the plaited fabric toward the pressing-rolls; means for reciprocating the tucker, and for causing it to press upon the platen during its advancing movement; means for lifting it from the platen during the retracting movement; means for adjusting the reciprocating and lifting devices to vary the reciprocating stroke and the lifting movement.

18. In a plaiting-machine, in combination with the pressing-rolls, the tucker, the frame by which it is carried, and tilting fulcrum-supports for such frame, inclined toward the rolls; said frame having a guide-arm extended oblique to the plane of reciprocation of the blade.

19. In a plaiting-machine, in combination with the pressing-rolls, a plait-laying means, consisting of a tucker and frame by which it is carried, tilting fulcrum-supports for said frame, inclined toward the rolls at the most advanced position of the frame; said frame having a guide-arm extending at the opposite side of said fulcrum from said rolls in an oblique direction approximately parallel to the chord of the arc through which the tilting fulcrum swings from its foremost inclined position to erect position; and a cam rotated above the inclined guide-arm and operating thereon to check the movement of said arm upward, shaped and located to operate downwardly upon said arm after the tilting fulcrum has commenced to approach erect position in the retracting motion of the tucker-frame.

20. In a plaiting-machine, plait-laying devices, consisting of a platen, H, a tucker coöperating therewith; a frame by which said tucker is carried; a rotating shaft and an eccentric thereon, and connections from the ring of said eccentric to the frame pivotally connected to the latter; whereby the eccentric communicates to said tucker-frame direct reciprocating motion only; a shifting fulcrum for said reciprocating frame intermediate the tucker and the opposite end of the frame; and a cam on the eccentric-shaft, operating on said opposite end to depress the same and elevate the tucker during the retracting movement.

21. In a plaiting-machine, plait-laying means, comprising a platen, H, a tucker-blade coöperating therewith, a frame to which said blade is attached, by which it is reciprocated over the platen; a shifting fulcrum for such frame; a revolving shaft and an eccentric thereon, and a connecting-rod extending from the ring of said eccentric to the tucker-frame and suitably connected to the latter; a cam on the eccentric-shaft, operating upon the end of the same opposite the tucker-blade to depress said end and elevate the blade, the fulcrum of said tucker-frame being adjustable up and down.

22. In combination with the tucker-frame, the tilting supports, L, L, for the same; clips, $L^2$, pivoted to the tucker-frame, and socketed to adapt them to enter upon the upper ends of the supports L, and adjustable screws, $L^3$, set into said clips to limit the depth of the socket and adjustable therein to vary the vertical position of the clips on the supports, and thereby adjust the fulcrum vertically.

23. In a plaiting-machine, in combination with a pair of pressing-rolls, plaiting devices adapted to lay the tucks in the fabric and advance the same between the rolls; a check-bar, T, located in position to rest against the folds of the plaits; means by which such check-bar is suspended from pivots located above and forward of said position of the check-bar; whereby said check-bar tends by gravity to press bodily yieldingly inward toward the rolls to hold the plaits yieldingly toward and between the latter.

24. In combination with the pressing-rolls and the plaiting means, the eccentrics which operate said rolls and plaiting means, comprising each an inner disk and an outer ring, having peripheral grooves facing each other and balls in such grooves, said outer ring being divided at one side and provided with clamping-lugs and means for forcing them together, and grooves in the faces of such lugs extending to the groove in the inner periphery of the ring, and suitable means for closing up the passage formed by such grooves in the lugs after the balls are inserted therethrough.

25. In a plaiting-machine, in combination with pressing-rolls, plaiting means operating at the entering side of the rolls to lay the plaits and enter the same between the rolls; a check, R, extending along the rolls at the entering side, in position to rest against the folds of the plait, and means tending to press such check bodily yieldingly inward toward the rolls, to hold the plaits yieldingly toward and between the rolls.

26. In a plaiting-machine, in combination with a pair of pressing-rolls, plaiting means adapted to lay the tucks in the fabric and advance the same between the rolls; a check-bar, R, suspended at the entering side of the rolls, tending to swing in toward their line of contact, to hold the plaits against the upper roll until they are grasped between the rolls.

27. In a plaiting-machine in combination with the pressing-rolls, a plait-laying tucker-blade, means by which the blade is reciprocated toward and from the rolls, adjustable means for controlling the reciprocation to cause one end of the blade to make a longer stroke than the other.

28. In a plaiting-machine, in combination with the pressing-rolls, the plait-laying tucker, the frame by which it is carried, parallel guides for said frame at opposite sides thereof at the end toward the rolls; a single guide for the opposite end of the tucker-frame, said last-mentioned guide being adjustable to deflect it from the direction parallel with the other guides; and means for reciprocating said frame.

29. In a plaiting-machine, in combination with the pressing-rolls, the plait-laying tucker and the frame by which it is carried; independent supports for the frame, widely separated transversely with respect to the reciprocating movement of the frame; parallel lateral guides for the frame, at the end toward the rolls; a third guide for the opposite end, said third guide being adjustable to deflect it from the direction parallel with the other guides; and means for reciprocating the frame over its said transversely-separated supports.

30. In a plaiting-machine, in combination with the pressing-rolls, the plait-laying tucker, the frame by which it is carried, independent supports at opposite sides thereof, by means of which it may be reciprocated; the laterally-projecting studs at the end toward the rolls, and parallel guides for the same on the frame; the single guide-arm for the frame at the opposite end, having the guide-plate, $k^{13}$, adjustable on said arm to deflect its guide edges; and the guide projections on the frame between which said plate reciprocates.

31. In a plaiting-machine, in combination with a pair of pressing-rolls, standards in which they are mounted having upwardly open guideways for the bearings of the upper roll; levers pivoted to the frame and extending transversely with respect to the rolls; links pivoted to said levers respectively; bearings for the upper roll; stops on the links respectively, located above the pivots of the links to the levers, and springs reacting between said stops and said bearings.

32. In a plaiting-machine, in combination with a pair of pressing-rolls, one above the other, levers, P, P, connected to the rolls, having pivoted to them the links, $P^2$, said links having horizontally-jutting eyes; bearings for the upper roll having stems extending through said eyes; stop-nuts on the ends of the stems respectively, and springs interposed between said eyes and the bearings on the one side, and the stop-nuts on the other side, and means for adjustably securing said levers to the frame.

33. In combination with a pair of pressure-rolls, the levers, P, P, pivoted to the frame, the bearings for the upper roll carried by said levers; springs reacting between the bearings and levers, respectively, to hold the upper roll yieldingly toward the lower roll; the link, P', pivoted to the lever, having sideward-jutting eyes, $P^{10}$, and the rod, $P^4$, pivoted to the frame and extending through such eyes.

34. In combination with plait laying and pressing devices, means for carrying the fabric to be plaited to such devices, and a steamer over which the fabric is thus carried on its way to the pressing devices, said steamer having a tubular chamber extending from end to end and open at the ends, and a fuel-gas burner extending longitudinally through such tubular chamber, whereby the products of combustion are diverted longitudinally with respect to the chamber, and delivered laterally beyond the fabric.

35. In a plaiting-machine, in combination with the plait laying and pressing devices, an endless apron for carrying the plaits between the pressing devices, a steamer over which said apron passes on its way to such pressing devices, said steamer having a tubular chamber extending from end to end and open at the ends, and a fuel-gas burner extending longitudinally through such tubular chamber, whereby the heating-flame for said steamer and the products of combustion thereof are deflected longitudinally with respect to the steamer, transversely with respect to the path of movement of the apron and fabric to be plaited, and delivered laterally beyond said fabric.

36. In a plaiting-machine, in combination with the plait laying and pressing devices, an endless apron for carrying the plaits between the pressing devices; a steamer, over which said apron passes on its way to said pressing devices, said steamer having a tubular chamber extending from end to end and open at the ends; a longitudinal aperture at the bottom of the steamer leading into the tubular chamber; and a fuel-gas burner extending longitudinally through such tubular chamber at the lower part thereof, above said bottom aperture.

In testimony whereof I have hereunto set my hand, at Chicago, Illinois, in the presence of two witnesses, this 18th day of May, A. D. 1900.

E. W. SILSBY.

In presence of—
CHAS. S. BURTON,
E. L. CONANT.